No. 733,013. PATENTED JULY 7, 1903.
E. P. CONVERSE & J. J. LEITER.
TOOL FOR MAKING MARBLES.
APPLICATION FILED APR. 7, 1903.
NO MODEL.

Witnesses
Edward Nelius
J. R. Bond

Inventors
Emile P. Converse
Jeremiah J. Leiter
By F. W. Bond
Attorney

No. 733,013. Patented July 7, 1903.

UNITED STATES PATENT OFFICE.

EMILE P. CONVERSE, OF MASSILLON, AND JEREMIAH J. LEITER, OF CANTON, OHIO; SAID LEITER ASSIGNOR TO SAID CONVERSE.

TOOL FOR MAKING MARBLES.

SPECIFICATION forming part of Letters Patent No. 733,013, dated July 7, 1903.

Application filed April 7, 1903. Serial No. 151,535. (No model.)

*To all whom it may concern:*

Be it known that we, EMILE P. CONVERSE, residing at Massillon, and JEREMIAH J. LEITER, residing at Canton, in the county of Stark and State of Ohio, citizens of the United States, have invented certain new and useful Improvements in Tools for Making Marbles; and we do hereby declare that the following is a full, clear, and exact description of the same, reference being had to the annexed drawings, making a part of this specification, and to the figures of reference marked thereon, in which—

Figure 1:
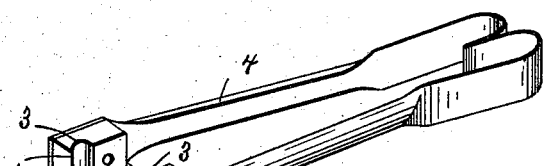
Figure 2:
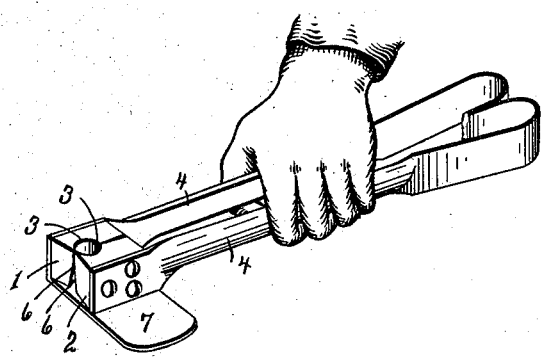
Figure 3:
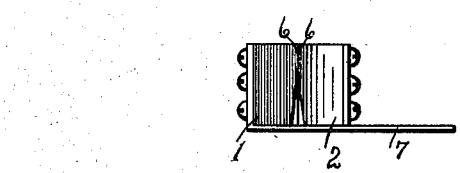
Figure 4:
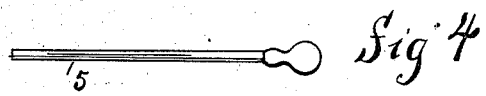

Figure 1 is a perspective view showing the jaws open. Fig. 2 is a similar view showing the jaws closed and in position to produce a marble. Fig. 3 is a front view of the jaws, showing the same closed and in position to cut the neck from the body of the marble or sphere. Fig. 4 is a view showing the glass-holding bar and the finished sphere located thereon.

The present invention has relation to tools for making marbles or spheres; and it consists in the novel arrangements hereinafter described, and particularly pointed out in the claim.

Similar numerals of reference indicate corresponding parts in all the figures of the drawings.

In the accompanying drawings, 1 and 2 represent the jaws, which may be and preferably are of the form shown in the drawings, and their inner faces are each provided with the vertical semicircular grooves 3 and are located directly opposite each other, so that when the jaws 1 and 2 are brought together, as illustrated in Fig. 2, a round aperture is produced. It will be understood that in forming spheres of different sizes the semicircular grooves 3 must be of a size to correspond with the size of the sphere designed to be formed.

The jaws 1 and 2 are connected to the opposite members of the spring-handle 4, which handle is formed of a length to be easily grasped by the hand and moved back and forth, as hereinafter described.

In use a suitable melting-pot or crucible of any suitable style or kind is used to properly melt the material, and a sufficient amount of material is taken from the pot or crucible to form a sphere of the desired size. The most simple way is to employ a round rod or steel bar, such as 5, of suitable size and length, which is dipped into the material a sufficient number of times to gather the amount required, the amount of course being in proportion to the size of the marble previously determined on. The material employed is at this time plastic glass. The plastic glass, which is located upon the bar 5, is placed between the jaws 1 and 2 and the bar rolled on the top of a table or bench back and forth, and the jaws, together with the spring-handle, moved by the hand along with the traveling motion of the bar 5. It will be understood that it is necessary to cut the neck or that portion of the glass between the bar and the sphere, and in order to accomplish this the jaws 1 and 2 are each provided with the cutting-blades 6, which cutting-blades are spaced from each other at their bottom ends and at their upper ends or portions come in cutting contact with each other, so that as the jaws, together with the handle, are moved downward, so as to force the neck up toward the top of the jaws, said neck will be cut or severed. The operation of cutting the neck has heretofore been accomplished by a separate pair of shears or devices; but by our peculiar arrangement we are enabled to cut the neck by means of the cutting-blades 6, carried by the jaws, said cutting-blades being beveled, so as to provide suitable cutting contact at their upper ends; but leaving the blades spaced from each other at their bottom or lower ends, and by the lowering of the jaws in reference to the bar 5 or moving the bar 5 up the neck will be cut. It will be understood that it makes no difference, so far as the operation of cutting is concerned, whether the jaws, together with the cutting-blades, be moved down and the bar remain stationary or the jaws and blades stationary and the bar moved upward. It is the relative movement between the bar and the cutting-blades by which the cutting of the neck is done.

For the purpose of keeping the jaws 1 and 2 in proper relation to each other the plate 7 is fixed to the jaw 1, or, in other words, said plate is secured to one of the jaws and the opposite jaw left free to slide on the plate.

It will be understood that by locating the blades as shown the neck of the sphere can be cut exceedingly close to the sphere or marble.

Having fully described our invention, what we claim as new, and desire to secure by Letters Patent, is—

The combination of jaws secured to the handle members, the jaws being provided with semicircular grooves and with cutting-blades tapered away from each other toward their bottom or lower ends, and a plate secured to one of the jaws, substantially as and for the purpose specified.

In testimony that we claim the above we have hereunto subscribed our names in the presence of two witnesses.

EMILE P. CONVERSE.
JEREMIAH J. LEITER.

Witnesses:
J. A. JEFFERS,
F. W. BOND.